(12) United States Patent
Kurniawan (10) Patent No.: US 12,003,142 B2
(45) Date of Patent: Jun. 4, 2024

(54) HVAC BLOWER MOTOR

(71) Applicant: Valeo Climate Control Corporation, Auburn Hills, MI (US)

(72) Inventor: Darius Kurniawan, Auburn Hills, MI (US)

(73) Assignee: Valeo Climate Control Corporation, Auburn Hills, MI (US)

( * ) Notice: Subject to any disclaimer, the term of this patent is extended or adjusted under 35 U.S.C. 154(b) by 373 days.

(21) Appl. No.: 17/318,243

(22) Filed: May 12, 2021

(65) Prior Publication Data
US 2022/0368185 A1 Nov. 17, 2022

(51) Int. Cl.
| | |
|---|---|
| H02K 1/28 | (2006.01) |
| F04D 25/06 | (2006.01) |
| F04D 29/66 | (2006.01) |
| H02K 5/24 | (2006.01) |
| H02K 21/22 | (2006.01) |

(52) U.S. Cl.
CPC ............... *H02K 1/28* (2013.01); *F04D 25/06* (2013.01); *F04D 29/668* (2013.01); *H02K 5/24* (2013.01); *H02K 21/22* (2013.01)

(58) Field of Classification Search
CPC ............... B32B 11/046; B32B 2405/00; B32B 2307/56; B32B 2307/102; F04D 29/664; F04D 29/668; H02K 21/22; H02K 5/24; H02K 1/28
See application file for complete search history.

(56) References Cited

U.S. PATENT DOCUMENTS

2016/0023342 A1* 1/2016 Koenig ..................... B25C 1/06
173/124

FOREIGN PATENT DOCUMENTS

| | | | |
|---|---|---|---|
| EP | 0117385 A2 * | 9/1984 | |
| FR | 3050490 A1 * | 10/2017 | ......... F04D 25/0613 |

OTHER PUBLICATIONS

FR-3050490-A1 Translation (Year: 2017).*

* cited by examiner

*Primary Examiner* — Schyler S Sanks
(74) *Attorney, Agent, or Firm* — Osha Bergman Watanabe & Burton LLP (57) ABSTRACT

An HVAC blower motor (10) includes a stator (12) and a rotor (14). The stator (12) include electro-magnets (12a) energized at pre-determined energizing frequency. The rotor (14) angularly moves relative to the stator (12) due to pulsating magnetic field between the stator (12) and the rotor (14). The rotor (14) includes an output shaft (24), a magnet holder (14a) and a plurality of permanent magnets (20). The permanent magnets (20) are configured to interact with the cyclically energized electro-magnets (12a) to cause pulsating magnetic field between the stator (12) and the rotor (14) to cause angular movement of the rotor (14) relative to the stator (12). The magnet holder (14a) includes a strip (15) of vibration damping material secured thereto along an outer periphery thereof to change the natural frequency characteristic of the wall portion 14c is subjected to.

10 Claims, 5 Drawing Sheets

HVAC BLOWER MOTOR

FIELD OF THE INVENTION

The present invention relates to a motor, particularly, the present invention relates to an HVAC blower motor.

BACKGROUND

An HVAC blower motor is a permanent magnet DC motor with copper brushes or without copper brushes (i.e. brushless) to generate rotational motion from an electrical energy. In case of a brushless DC motor, the stator includes electromagnets in form of coils wound around cores and the rotor includes magnets, preferably, permanent magnets mounted thereon, whereas in case of the brushed DC motor, the rotor is centrally disposed and includes electromagnets in form of coil wound around cores and the stator includes the magnets, preferably permanent magnets placed on either side of the rotating electromagnet. The brushless DC motor uses electrical commutation to deliver current to the coils of the electro-magnets instead of mechanical commutation used for delivering current to the coils of the electro-magnets in case of the brushed DC motor. More specifically, the brushless DC motor employs control circuitry instead of metallic brushes used to deliver current to the coils in case of the brushed DC motor. The brushless DC motor involves several advantages over the brushed motor. For example, the brushless DC motor involves less maintenance compared to brushed motor as the use of brushes is eliminated. Further, the brushless DC motors are comparatively more efficient and can operate within a high speed range and with low noise compared to brushed DC motor.

The brushless DC motor includes a stator and a rotor. The stator includes electro-magnets formed by winding coils over corresponding cores, wherein current is delivered to the coils using electrical commutation, particularly, a controller or control circuitry. The electromagnets are energized at pre-determined energizing frequency, referred to as motor commutation frequency (F) based on the current delivered and flowing through the coils. More specifically, the electromagnets of the stator act as north or south poles based on the current delivered and flowing through the coils, specifically, based on the motor commutation frequency. The rotor angularly moves relative to the stator along an axis of rotation "A" of the brushless DC motor extending in an axial direction, due to pulsating magnetic field between the stator and the rotor. The rotor includes an output shaft, a magnet holder, also referred to as yoke and a plurality of permanent magnets. The output shaft is centrally protruding from the rotor and is configured to rotate therewith to deliver torque. The magnet holder is centrally mounted along the axis of rotation of the HVAC blower motor. The permanent magnets of the rotor are held within the magnet holder to interact with the cyclically energized electro-magnets of the stator to cause the pulsating magnetic field between the stator and the rotor to cause angular movement of the rotor with respect to the stator. More specifically, the rotor angularly moves relative to the stator along the axis of rotation "A" of the brushless DC motor extending in an axial direction, due to interaction between the magnetic fields of the permanent magnet of the rotor and the magnetic field of the electro-magnets of the stator. The yoke includes a hub portion and a wall portion. The wall portion is extending from a periphery of the hub portion and securely holds permanent magnets. More specifically, the permanent magnets are secured to inner side of the wall portion of the yoke. The output shaft centrally protrudes from and rotates with the rotor along the axis of rotation "A" of the brushless DC motor extending in the axial direction to deliver torque.

The wall portion of the yoke, being in contact with the permanent magnets is subjected to pulsating vibration at the vibration frequency ($8^{th}$ order or H8 for 8-magnets motor) due to interaction magnetic field between the stator and the rotor. In a case where the structure vibration frequency of the wall portion matches with the pulsating frequency of the motor (i.e. resonance), an effective coupling occurs as a result. This motor commutation $8^{th}$ order frequency can particularly be problematic in the form of noise when the yoke resonance (~300 Hz) interacts and amplifies it at 2300 rpm motor speed. Such noise generated by the brushless DC motor is a problem in vehicular environment, particularly, in case the vehicle is an electric vehicle in which engine noise is absent, the noise caused by resonance between vibration frequency of the wall portion of the yoke and the motor commutation frequency is not suppressed/masked by the engine noise. The noise can cause discomfort and distraction to occupants of the vehicle. Further, the resonance between the vibration frequency of the wall portion and the motor commutation frequency may cause increase in vibration frequency of the wall portion. In case of increase in the vibration frequency experienced by the wall portion of the yoke due to the resonance, the motor power is dissipated as noise and the efficiency and performance of the motor is reduced. Accordingly, the noise issue is required to be addressed.

However, the conventional HVAC blower motor fails to address the noise caused by the resonance between vibrating frequency to which the wall portion of the rotor is subjected to and the motor commutation frequency.

Accordingly, there is a need for an HVAC blower motor that addresses the noise issue by preventing the resonance. Further, there is a need for a HVAC blower motor addressing the noise issues without requiring many modifications. Further there is a need for an HVAC blower motor that addresses the noise issue by incorporating additional element that is simple in construction and that can be easily integrated to the HVAC blower motor.

SUMMARY OF THE INVENTION

An object of the present invention is to provide an HVAC blower motor that reduces HVAC blower motor noise by reducing/eliminating interaction between yoke vibration frequency and motor commutation frequency, thereby obviating the drawbacks associated with the blower motor noise caused by the resonance amplification.

Another object of the present invention is to provide an HVAC blower motor that eliminates resonance due to vibration frequency of wall portion of a magnet holder matching/resonating with motor commutation frequency to limit the vibration frequency.

Yet another object of the present invention is to provide a HVAC blower motor that addresses the HVAC blower motor noise issue without much modifications.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

An HVAC blower motor is disclosed in accordance with an embodiment of the present invention. The HVAC blower motor includes a stator and a rotor. The stator includes electro-magnets configured to be energized at pre-determined energizing frequency. The rotor angularly moves relative to the stator along an axis of rotation "A" of the HVAC blower motor extending in an axial direction, due to pulsating magnetic field between the stator and the rotor. The rotor includes an output shaft, a magnet holder and a plurality of permanent magnets. The output shaft is centrally protruding from the rotor and is configured to rotate therewith to deliver torque. The magnet holder is centrally mounted along the axis of rotation "A" of the HVAC blower motor. The plurality of permanent magnets held with the magnet holder are configured to interact with the cyclically energized electro-magnets of the stator to cause the pulsating magnetic field between the stator and the rotor to cause angular movement of the rotor with respect to the stator. The magnet holder of the rotor includes a strip of vibration damping material secured thereto along an outer periphery of the magnet holder to change the frequency characteristic of the pulsating vibration to which the magnet holder is subjected to.

Typically, the blower motor is a brushless blower motor.

Typically, the strip of vibration damping material is glued along the outer periphery of the magnet holder.

Alternatively, the strip of vibration damping material is heat bonded to the outer periphery of the magnet holder.

Particularly, the magnet holder includes a hub portion and a wall portion. The wall portion extends from a periphery of the hub portion and securely holds the permanent magnets.

Generally, the wall portion includes at least one groove formed at the outer periphery thereof to receive and position the strip of vibration damping material.

The strip of vibration damping material is a combination of strips of different damping material that are alternatively arranged with respect to each other in the radial direction.

Specifically, the strip of vibration damping material includes at least one strip of viscoelastic asphaltic blend with a heat bondable film applied on at least one side of the strip of viscoelastic asphaltic blend.

The strip of viscoelastic asphaltic blend is having following properties
  a specific gravity of 1.60 to 1.85 kg/m$^3$;
  a solid content of 99-100 percent;
  exhibition of peel adhesion, cohesive failure when exposed to heat aging at 70° C. for 2 weeks, 100% humidity at 38° C. for 250 hours and environmental cycle of 6 weeks.

Generally, the heat bondable film is a nitrile phenolic based thermoplastic bonding film.

The HVAC blower includes the HVAC blower motor as disclosed above.

A Heating Ventilation and Air-Conditioning (HVAC) module includes a housing, at least one heat exchanger and an HVAC blower. The housing includes an HVAC housing. The at least one heat exchanger is received inside the HVAC housing. The HVAC blower includes the HVAC blower motor as disclosed above.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

FIG. 3a illustrates an isometric view of the HVAC blower motor of the FIG. 1a;

FIG. 3b illustrates an isometric view of the stator of the HVAC blower motor of the FIG. 1a;

FIG. 7 illustrates a schematic representation of a HVAC module that includes a housing for receiving a blower, at least one heat exchanger and the blower comprising an HVAC blower motor as illustrated in FIG. 1a.

It must be noted that the figures disclose the invention in a detailed enough way to be implemented, said figures helping to better define the invention if needs be. The invention should however not be limited to the embodiment disclosed in the description.

DETAILED DESCRIPTION

The present invention relates to an HVAC blower motor, particularly, a brushless motor used in vehicular environment. The motor includes a stator and a rotor. The stator include coils wound over cores, the coils and the cores are collectively referred to as electro-magnets that are energized at pre-determined energizing frequency, particularly, motor commutation frequency. The rotor angularly moves relative to the stator along an axis of rotation "A" of the HVAC blower motor extending in an axial direction due to pulsating magnetic field between the stator and the rotor. The rotor includes an output shaft, a magnet holder or yoke, also referred to as a yoke and a plurality of permanent magnets. The output shaft centrally protrudes from the rotor to deliver torque. The yoke is centrally mounted along the axis of rotation of the blower motor and includes a hub portion, and a wall portion. The wall portion extends from a periphery of the hub portion and securely holds the permanent magnets. The permanent magnets of the rotor held within the magnet holder interact with the cyclically energized electro-magnets of the stator to cause the pulsating magnetic field between the stator and the rotor to cause angular movement of the rotor with respect to the stator. The wall portion being in contact with the permanent magnet is subjected to pulsating vibration at vibration frequency (f) due to pulsating magnetic field between the stator and the rotor. The yoke of the rotor includes a strip of vibration damping material secured thereto along an outer periphery of the wall portion to change the frequency characteristic of the pulsating vibration to which the wall portion is subjected to. More specifically, the strip of vibration damping material regulates the vibration frequency of the wall portion to eliminate the resonance between the vibration frequency of the wall portion and the motor commutation frequency. Although, the present invention is explained in the forthcoming description and accompanying drawings with example of HVAC blower motor used in vehicular environment, however, the present invention is not limited to HVAC motor used in vehicular applications but is also applicable for any motor used in vehicular or non-vehicular environment, where it is required to reduce motor noise by eliminating resonance between vibration frequency of the wall portion of the yoke and the motor commutation frequency.

Figure 1A:
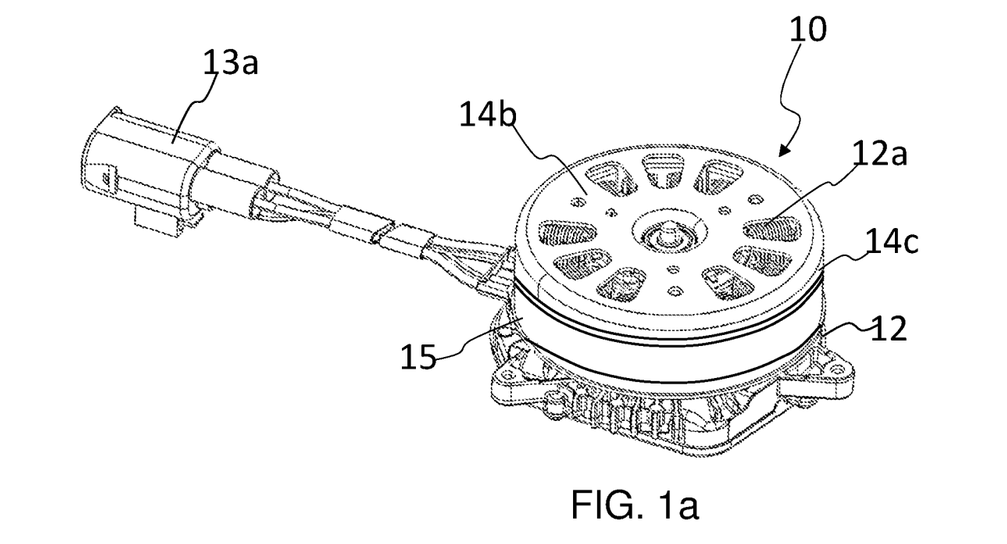
FIG. 1a illustrates an isometric view of a blower motor in accordance with an embodiment of the present invention in an assembled configuration.
Figure 1B:
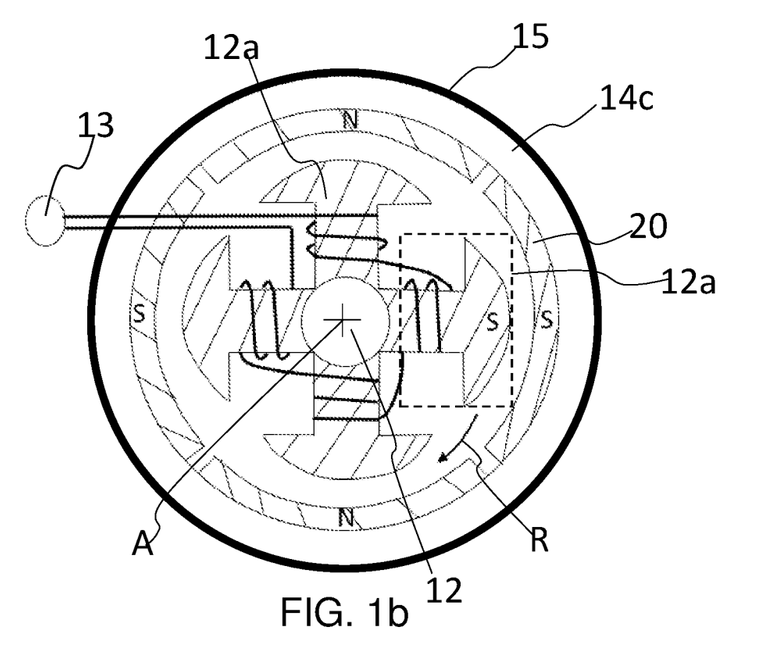
FIG. 1b illustrates a schematic sectional representation of the HVAC blower motor in accordance with an embodiment of the present invention.
Figure 2:
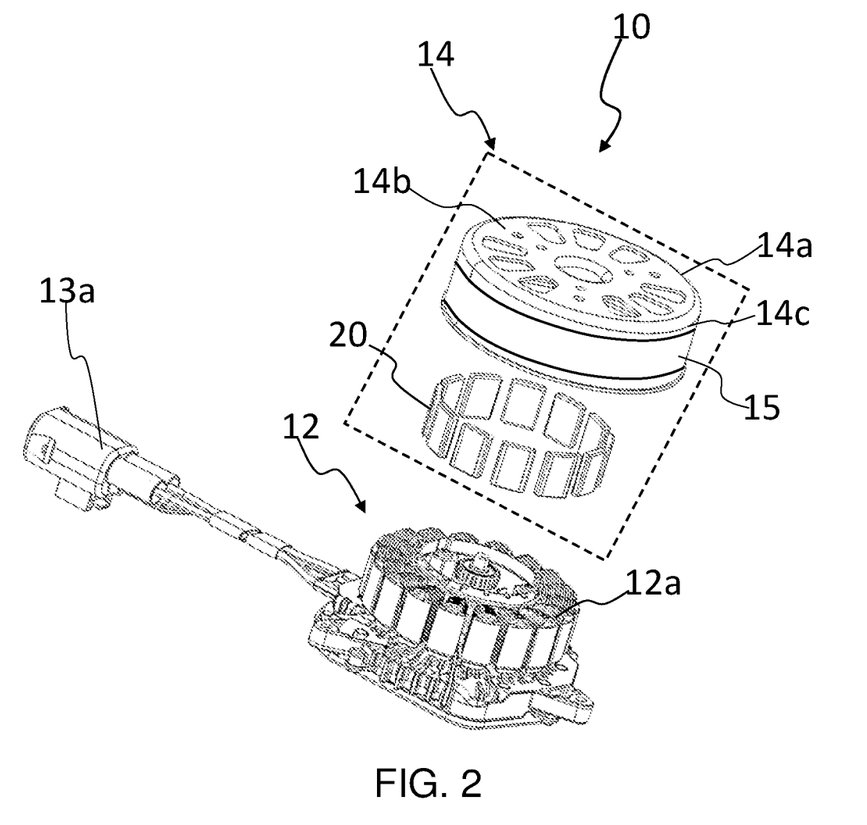
FIG. 2 illustrates an exploded view of the HVAC blower motor of the FIG. 1a depicting various components, such as a stator and a rotor thereof.

The present invention envisages an HVAC blower motor in accordance with an embodiment of the present invention that addresses the problem of noise by eliminating resonance between vibration frequency (f) of the wall portion of the yoke and motor commutation frequency. FIG. 1a illustrates an isometric view of an HVAC blower motor 10 in accordance with an embodiment of the present invention. FIG. 1b illustrates a sectional view of the HVAC blower motor 10 in accordance with another embodiment. The HVAC blower motor 10 includes a stator 12 and a rotor 14. The HVAC blower motor 10 is a brushless DC blower motor, wherein interaction/pulsating magnetic field between energized electromagnets 12a of the stator 12 and permanent magnets 20 mounted on the rotor 14 causes rotation of the rotor 14 with respect to the stator 12. The electromagnets 12a of the stator 12 are formed by winding coils on the core and are cyclically energized by current delivered to the coils of the electromagnet 12a of the stator 12 using electrical commutation. FIG. 1a depicts an electric power connector 13a connected to the electric cables delivering electric current to the coils of the electromagnets 12a. FIG. 2 illustrates an exploded view of the HVAC blower motor 10 depicting the stator 12, the rotor 14 thereof along with various elements of the stator 12 and the rotor 14.

Figure 3A:
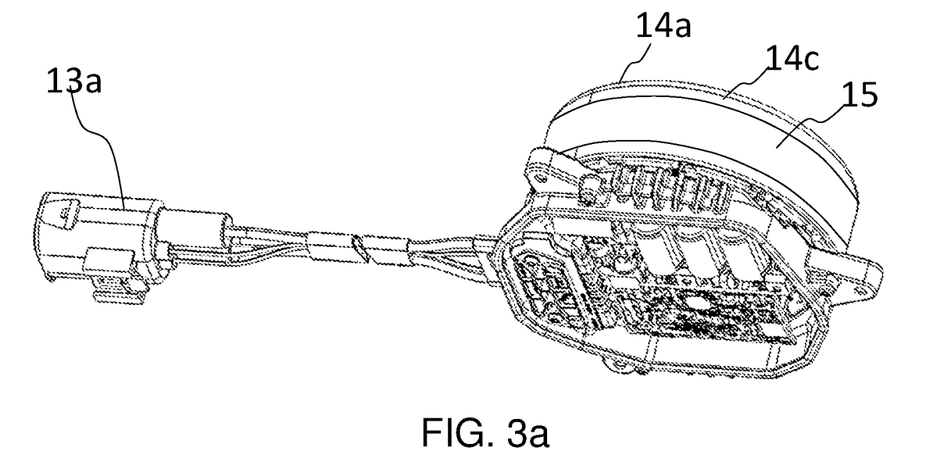
Figure 3B:
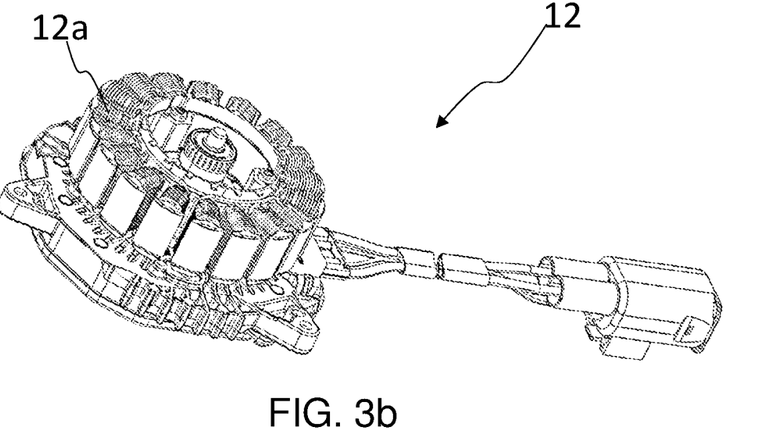

FIG. 3a illustrates an isometric view of the HVAC blower motor 10 depicting the stator 12. FIG. 3b illustrates another isometric view of the stator 12 of the HVAC blower motor 10. The stator 12 is fixed relative to a blower housing 22b and includes coils wound over respective cores, the combination of coils and cores are collectively referred to as the electromagnets 12a that are cyclically energized at pre-determined energizing frequency, referred to as motor commutation frequency. The electromagnets 12a of the stator 12 are energized by using electrical commutation. Particularly, the electromagnets 12a are energized at pre-determined energizing frequency, referred to as the motor commutation frequency (F) based on the current delivered and flowing through the coils. More specifically, the electromagnets 12a of the stator 12 act as north or south poles based on the current delivered and flowing through the coils thereof, specifically, based on the motor commutation frequency F.

Figure 4:
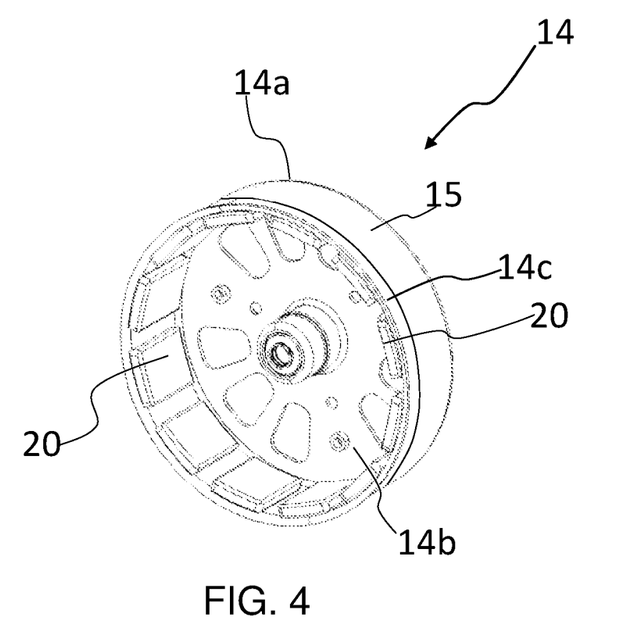
FIG. 4 illustrates an isometric view of the rotor of the HVAC blower motor of the FIG. 2.

FIG. 4 illustrates the rotor 14 for the HVAC blower motor 10. The rotor 1 angularly moves relative to the stator 12 along an axis of rotation "A" of the HVAC blower motor 10 extending in an axial direction, due to pulsating magnetic field between the stator 12 and the rotor 14. The permanent magnets 20 of the rotor 14 interacts with the cyclically energized electromagnets 12a of the stator 12 to cause the pulsating magnetic field between the stator 12 and the rotor 14, thereby causing angular movement of the rotor 14 with respect to the stator 12. More specifically, the rotor 14 angularly moves relative to the stator 12 along the axis of rotation "A" of the HVAC blower motor 10 extending in an axial direction, due to interaction/pulsating magnetic field between the magnetic fields of the permanent magnet 20 of the rotor 14 and the magnetic field of the electromagnets 12a of the stator 12. In one embodiment as illustrated in FIG. 1b, attraction between a north pole of the permanent magnet 20 of the rotor 14 and a south pole of the electromagnet 12a of the stator 12 causes rotation of the rotor 14 with respect to the stator 12 along the direction depicted by arrow "R" in FIG. 1b, as the stator 12 is fixed. In accordance with another embodiment, repulsion between a North Pole of the permanent magnet 20 of the rotor 14 and North Pole of the electromagnet 12a of the stator 12 causes rotation of the rotor 14. Any combination of attraction and repulsion forces between the permanent magnet 20 of the rotor 14 and the electromagnet 12a of the stator 12 can be used for causing rotation of the rotor 14 with respect to the stator 12.

The rotor 14 includes an output shaft 24, a magnet holder 14a, also referred to as a yoke 14a and the permanent magnets 20. The permanent magnets 20 of the rotor 14 interact with the electromagnets 12a of the stator 12 to cause the pulsating magnetic field between the stator 12 and the rotor 14 to cause angular movement of the rotor 14 with respect to the stator 12. The pulsating magnetic field between the electromagnets 12a of the stator 12 and the permanent magnets 20 of the rotor 14 cause the angular movement of the rotor 14 with respect to the stator 12.

Figure 5:
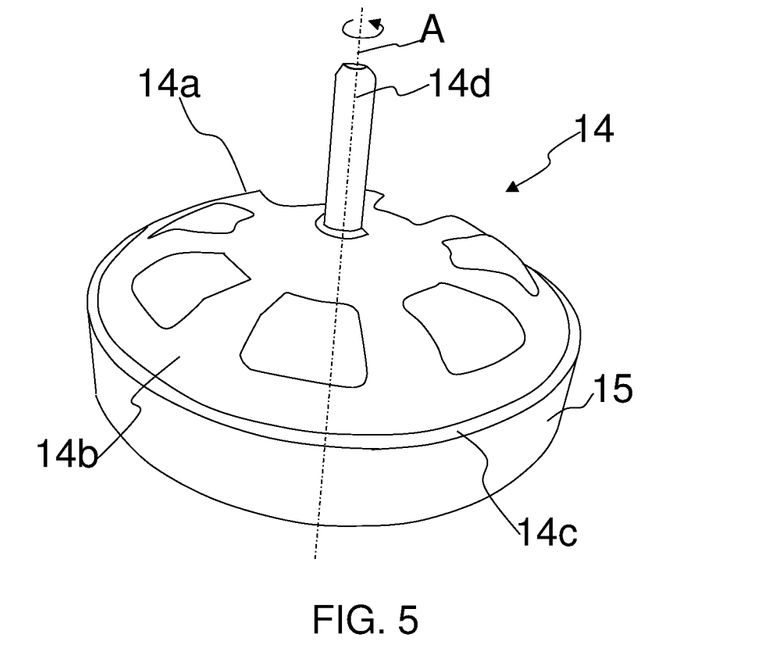
FIG. 5 illustrates another isometric view of the rotor of the HVAC blower motor of the FIG. 2, with an output shaft integrally formed with a magnet holder, also referred to as a yoke of the rotor.

The output shaft 24 is centrally protruding from the rotor 14 and is configured to rotate therewith to delivers torque. The output shaft 24 can be integrally formed with the yoke 14a of the rotor 14 as illustrated in FIG. 5 or the output shaft 24 is secured to the yoke 14a of the rotor 14 using flange and bolts. However, the present invention is not limited to any particular configuration of securing the output shaft to the rotor 14. The yoke 14a is centrally mounted along the axis of rotation of the HVAC blower motor 10 and includes a hub portion 14b and a wall portion 14c. The wall portion 14c is extending from a periphery of the hub portion 14b and securely holds the permanent magnets 20. More specifically, the permanent magnets 20 are secured to an inner surface of the wall portion 14c. The permanent magnets 20 are configured to interact with the cyclically energized electromagnets 12a of the stator 12 to cause the pulsating magnetic field between the stator 12 and the rotor 14 to cause angular movement of the rotor 14 with respect to the stator 12. Due to the permanent magnets 20 being secured to the wall portion 14c and the pulsating magnetic field between the electromagnets 12a of the stator 12 and the permanent magnets 20 of the rotor 14, the wall portion 14c is subjected to pulsating vibration at vibration frequency (f). In case the motor commutation frequency (F) vibration matches with the vibration resonant frequency (f) of the wall portion 14c of the yoke, there is an unwanted amplification of motor vibration as a result. The resonance is more prominent at the lower portion of the yoke 14a. The motor commutation noise at H8 or 8$^{th}$ order of vibration is particularly problematic at blower speed of 2300 rpm (H8 frequency=2300 rpm/60 sec/min*8=306 Hz) and the yoke having resonance vibration at ~300 Hz. Particularly, the yoke resonance vibration at ~300 Hz causes amplification of the motor H8 commutation noise at 2300 rpm. The resonance may also lead to increase in the vibration of the wall portion 14c of the yoke 14a. Accordingly, the wall portion 14c of the yoke 14a vibrates at high frequency due to resonance, resulting in noise.

In order to eliminate the resonance between the vibration frequency (f) of the wall portion 14c of the yoke 14a and the motor commutation frequency (F) and to reduce the noise, the resonance between the vibration frequency (f) of the wall portion 14c of the yoke 14a and the motor commutation frequency (F) is to be avoided. Accordingly, a strip 15 of vibration damping material is provided over the yoke 14a of the rotor 14. Particularly, the yoke 14a includes the strip 15 of vibration damping material secured thereto along an outer periphery of the wall portion 14c thereof to change the natural frequency characteristic of the wall portion 14c is subjected to. The added strip 15 of damping material on wall portion 14c of the yoke 14a reduces the resonance level, therefore reducing the 8th order motor vibration amplification that in turn lowers the 8th order noise More specifically, the damping material changes the resonance frequency (natural frequency) of the yoke 14a/wall portion 14c of the yoke 14a so that natural frequency of vibration of the yoke 14a/wall portion 14c of the yoke 14a does not amplify the motor commutation frequency at H8 frequency (~300 Hz) at 2300 RPM. By regulating the motor commutation frequency at H8 frequency (~300 Hz) at 2300 RPM, the noise due to motor commutation frequency at H8 frequency (~300 Hz) at 2300 RPM is controlled. As the resonance is more prominent at the base of the yoke 14a, the strip 15 of vibration damping material is applied to the base of the yoke 14a. FIG. 1a-FIG. 3a and FIG. 5 illustrates the yoke 14a configured with the strip 15 of vibration damping material secured along the outer periphery of the wall portion 14c of the yoke 14a. Specifically, the strip 15 of vibration damping material eliminates resonance due to the vibration frequency (f) of the wall portion 14c resonating with the motor commutation frequency (F), thereby reducing motor H8 commutation noise and also limiting the vibration frequency (f) of the wall portion 14c. More specifically, the strip 15 of vibration damping material may increase the stiffness and/or damping characteristic of the wall portion 14c of the yoke 14a, thereby arrests the increase in the vibration frequency of the wall portion 14c to eliminate the resonance caused by the vibration frequency (f) of the wall portion 14c of the yoke 14a resonating with the motor commutation frequency (F) to reduce the noise. By applying the strip 15 of vibration damping material along the periphery of the wall portion 14c of the yoke 14a, a measureable noise control (per test samples results: from 37 dBA to 30 dBA) can be achieved. Such reduction in noise is particularly beneficial in case of electric vehicle.

The wall portion 14c includes at least one groove formed at the outer periphery thereof to receive and position the strip 15 of vibration damping material. Generally, the strip 15 of vibration damping material is glued along the outer periphery of the yoke 14a. More specifically, the strip 15 of vibration damping material is glued along the outer periphery of the wall portion 14c of the yoke 14a. Alternatively, the strip 15 of vibration damping material is heat bonded to the outer periphery of the yoke 14a. More specifically, the strip 15 of vibration damping material is glued along the outer periphery of the wall portion 14c. However, the present invention is not limited to any particularly method for positioning and securing the strip 15 of vibration damping material over the wall portion 14c of the yoke.

Figure 6:
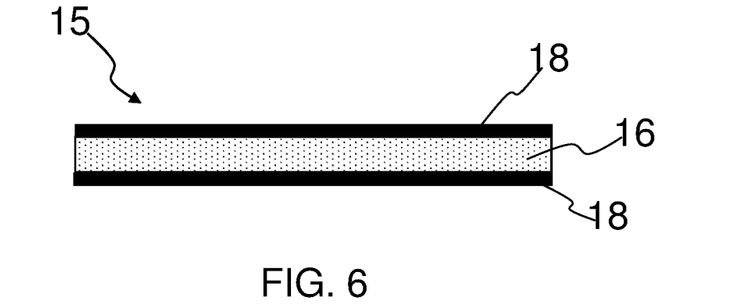
FIG. 6 illustrates a cross sectional view of a strip of vibration damping material secured to the yoke of the rotor of FIG. 2.

The strip 15 of vibration damping material is a combination of strips of different damping material that are alternatively arranged with respect to each other in the radial direction. Particularly, the strip 15 of vibration damping material is an "over the counter" available product, available with the commercial name of Nitto 1700 that is automotive grade material that is applicable for automotive applications. Preferably, the strip 15 of vibration damping material includes at least one strip of viscoelastic asphaltic blend 16 with a heat bondable film 18 applied on at least one side of the strip of viscoelastic asphaltic blend. Preferably, the heat bondable film 18 is applied to both sides of the strip of viscoelastic asphaltic blend, thereby enabling heat bonding of the strip 15 of vibration damping material to the wall portion 14c of the yoke 14a from either side of the strip 15 of vibration damping material. The strip 15 of the vibration damping material exhibits heat resistant properties against the heat generated by the motor components. The strip 15 of the vibration damping material being disposed along the entire periphery of the wall portion 14c of the yoke 14a to prevent blower imbalance or need for balance correction. The FIG. 6 illustrates a cross sectional view of the strip 15 of vibration damping material secured to the yoke 14a of the rotor 14.

The viscoelastic asphaltic blend is having specific gravity in the range of 1.60-1.85, solid content in the range of 99-100 percent and exhibits peel adhesion, cohesive failure when exposed to heat aging at 70° C. for 2 weeks, 100% humidity at 38° C. for 250 hours and environmental cycle of 6 weeks. The viscoelastic asphaltic blend is baked for 30 minutes at 110° C. to 120° C. and a 3.7 kg/m$^2$ and sheet of the viscoelastic asphaltic blend exhibits damping properties, composite loss factor of 0.1-0.2 between 10-55° C. @ 200 Hz. Generally, the heat bondable film 18 is a nitrile phenolic based thermoplastic bonding film.

Further, is disclosed an HVAC blower 40 in the form of a fan. In accordance with an embodiment of the present invention, the HVAC blower includes the HVAC blower motor 10 as disclosed above and the fan.

Figure 7:
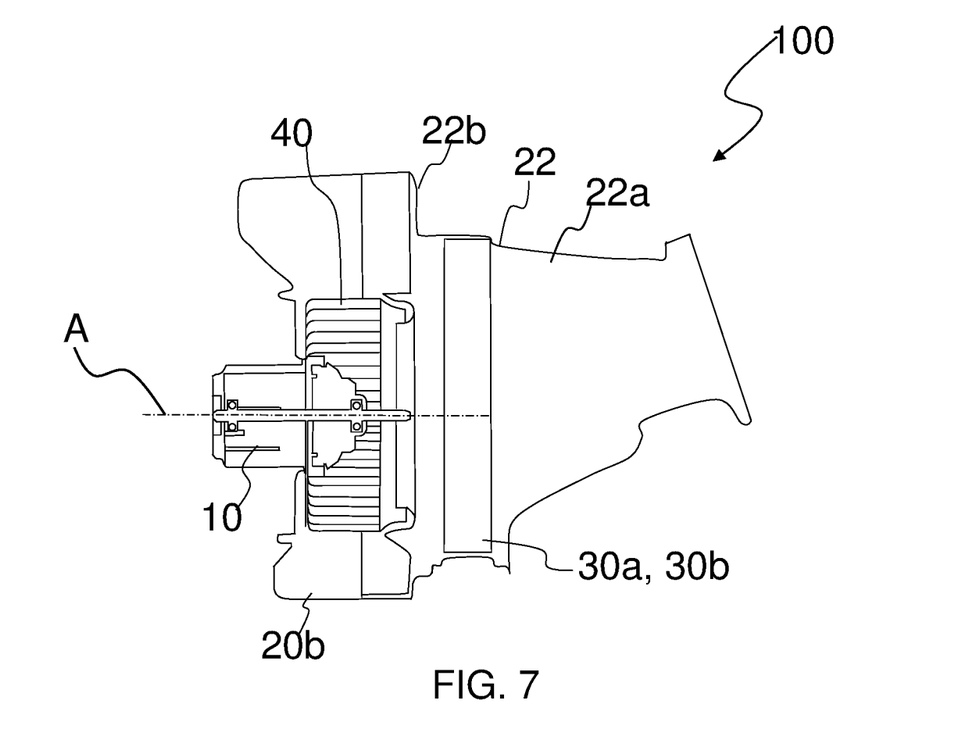

Also is disclosed a Heating Ventilation and Air-Conditioning (HVAC) module 100 in accordance with an embodiment of the present invention. The HVAC module 100 includes a housing 22, at least one heat exchanger 30a, 30b and the HVAC blower 40. The HVAC blower 40 includes a fan and the HVAC blower motor 10 as disclosed above. Generally, the housing 22 includes a HVAC housing 22a and the blower housing 22b. The heat exchanger 30a, 30b is received inside the HVAC housing 22a as depicted in FIG. 7. Although, the FIG. 7 depicts only one heat exchanger received inside the HVAC housing 22a, there could be more than one heat exchanger received inside the HVAC housing 22a. The HVAC blower 40 is received in the blower housing 22b and is driven by the HVAC blower motor 10. The blower housing 22b receiving the HVAC blower 40 is in fluid communication with an interior of the HVAC housing 22a and generates pressure difference across the heat exchanger 30a, 30b.

In any case, the invention cannot and should not be limited to the embodiments specifically described in this document, as other embodiments might exist. The invention shall spread to any equivalent means and any technically operating combination of means.

What is claimed is:

1. A Heating, Ventilation, and Air-Conditioning (HVAC) blower motor comprising:
   a stator comprising electromagnets configured to be energized at pre-determined energizing frequency;
   a rotor adapted to angularly move relative to the stator along an axis of rotation "A" of the HVAC blower motor extending in an axial direction due to pulsating magnetic field between the stator and the rotor, the rotor comprising:
   an output shaft centrally protruding from the rotor and configured to rotate therewith to deliver torque;
   a magnet holder centrally mounted along the axis of rotation "A" of the HVAC blower motor,
   a plurality of permanent magnets held within the magnet holder are configured to interact with the cyclically energized electromagnets of the stator to cause the pulsating magnetic field between the stator and the rotor to cause angular movement of the rotor with respect to the stator, wherein the magnet holder of the rotor comprises a strip of vibration damping material secured thereto along an outer periphery of the magnet holder to change the frequency characteristic of pulsating vibration to which the magnet holder is subjected to, wherein the magnet holder comprises: a hub portion, and a wall portion extending from a periphery of the hub portion and adapted to securely hold the permanent magnets, and wherein the wall portion comprises at least one groove formed at the outer periphery thereof to receive and position the strip of vibration damping material.

2. The HVAC blower motor as claimed in claim 1, wherein the HVAC blower motor is a brushless DC blower motor.

3. The HVAC blower motor as claimed in claim 1, wherein the strip of vibration damping material is glued along the outer periphery of the magnet holder.

4. The HVAC blower motor as claimed in claim 1, wherein the strip of vibration damping material is heat bonded to the outer periphery of the magnet holder.

5. The HVAC blower motor as claimed in claim 1, wherein the strip of vibration damping material is a combination of strips of different damping material that are alternatively arranged with respect to each other in the radial direction.

6. The HVAC blower motor as claimed in claim 1, wherein the strip of vibration damping material comprises at least one strip of viscoelastic asphaltic blend with a heat bondable film applied on at least one side of the strip of viscoelastic asphaltic blend.

7. An HVAC blower comprising the HVAC blower motor as claimed in claim 1.

8. A Heating, Ventilation, and Air-Conditioning (HVAC) blower motor comprising:
a stator comprising electromagnets configured to be energized at pre-determined energizing frequency;
a rotor adapted to angularly move relative to the stator along an axis of rotation "A" of the HVAC blower motor extending in an axial direction due to pulsating magnetic field between the stator and the rotor, the rotor comprising:
an output shaft centrally protruding from the rotor and configured to rotate therewith to deliver torque;
a magnet holder centrally mounted along the axis of rotation "A" of the HVAC blower motor,
a plurality of permanent magnets held within the magnet holder are configured to interact with the cyclically energized electromagnets of the stator to cause the pulsating magnetic field between the stator and the rotor to cause angular movement of the rotor with respect to the stator, wherein the magnet holder of the rotor comprises a strip of vibration damping material secured thereto along an outer periphery of the magnet holder to change the frequency characteristic of pulsating vibration to which the magnet holder is subjected to, wherein the strip of vibration damping material comprises at least one strip of viscoelastic asphaltic blend with a heat bondable film applied on at least one side of the strip of viscoelastic asphaltic blend, and wherein the strip of viscoelastic asphaltic blend is having following properties:
a specific gravity of 1.60 to 1.85 kg/m$^3$,
a solid content of 99 to 100 percent,
exhibition of peel adhesion,
cohesive failure when exposed to heat aging at 70° C. for 2 weeks,
100% humidity at 38° C. for 250 hours and environmental cycle of 6 weeks.

9. A Heating, Ventilation, and Air-Conditioning (HVAC) blower motor comprising:
a stator comprising electromagnets configured to be energized at pre-determined energizing frequency;
a rotor adapted to angularly move relative to the stator along an axis of rotation "A" of the HVAC blower motor extending in an axial direction due to pulsating magnetic field between the stator and the rotor, the rotor comprising:
an output shaft centrally protruding from the rotor and configured to rotate therewith to deliver torque;
a magnet holder centrally mounted along the axis of rotation "A" of the HVAC blower motor,
a plurality of permanent magnets held within the magnet holder are configured to interact with the cyclically energized electromagnets of the stator to cause the pulsating magnetic field between the stator and the rotor to cause angular movement of the rotor with respect to the stator, wherein the magnet holder of the rotor comprises a strip of vibration damping material secured thereto along an outer periphery of the magnet holder to change the frequency characteristic of pulsating vibration to which the magnet holder is subjected to, wherein the strip of vibration damping material comprises at least one strip of viscoelastic asphaltic blend with a heat bondable film applied on at least one side of the strip of viscoelastic asphaltic blend, and wherein the heat bondable film is a nitrile phenolic based thermoplastic bonding film.

10. A Heating Ventilation and Air-Conditioning (HVAC) module comprising:
an HVAC housing;
at least one heat exchanger received inside the HVAC housing;
an HVAC blower as claimed in claim 7.

* * * * *